(12) United States Patent
Bohm et al.

(10) Patent No.: US 7,724,550 B2
(45) Date of Patent: May 25, 2010

(54) ORGANIC RECTIFIER

(75) Inventors: Markus Bohm, Uttenreuth (DE);
Dietmar Zipperer, Erlangen (DE);
Andreas Ullmann, Zirndorf (DE);
Markus Lorenz, Haibach (DE)

(73) Assignee: PolyIC GmbH & Co. KG, Furth (DE)

( * ) Notice: Subject to any disclaimer, the term of this patent is extended or adjusted under 35 U.S.C. 154(b) by 300 days.

(21) Appl. No.: 11/722,457

(22) PCT Filed: Dec. 20, 2005

(86) PCT No.: PCT/DE2005/002293

§ 371 (c)(1),
(2), (4) Date: Sep. 5, 2007

(87) PCT Pub. No.: WO2006/066559

PCT Pub. Date: Jun. 29, 2006

(65) Prior Publication Data

US 2008/0225564 A1    Sep. 18, 2008

(30) Foreign Application Priority Data

Dec. 23, 2004   (DE) .................. 10 2004 063 435

(51) Int. Cl.
*H02M 1/12* (2006.01)
(52) U.S. Cl. .......................... 363/48; 363/55
(58) Field of Classification Search .............. 363/21.03, 363/21.04, 21.05, 44, 48, 52, 55, 61, 68; 361/227, 228, 235; 701/1, 2, 29, 37, 36, 701/32; 315/200 R, 241 R, 245, 277, 255
See application file for complete search history.

(56) References Cited

U.S. PATENT DOCUMENTS

| 3,512,052 A | 5/1970 | MacIver et al. |
| 3,769,096 A | 10/1973 | Ashkin |
| 3,955,098 A | 5/1976 | Kawamoto |
| 3,999,122 A | 12/1976 | Winstel et al. |

(Continued)

FOREIGN PATENT DOCUMENTS

DE    2102735    8/1972

(Continued)

OTHER PUBLICATIONS

U.S. Appl. No. 10/344,926, filed Feb. 12, 2004, Adolf Bernds et al.

(Continued)

*Primary Examiner*—Rajnikant B Patel
(74) *Attorney, Agent, or Firm*—Carella, Byrne et al.; Elliot M. Olstein; William Squire

(57) ABSTRACT

The invention relates to an electronic device (5) in the form of a flexible multilayer film body, in particular an RFID transponder, and to a rectifier (52) for such an electronic device. The rectifier (52) has at least two organic diodes or organic field effect transistors each having at least one electrical functional layer composed of a semiconducting organic material. The rectifier (52) furthermore has two or more charging or charge-reversal capacitors which are connected up to the two or more organic diodes or organic field effect transistors in such a way that the charging or charge-reversal capacitors can be charged via different current paths.

17 Claims, 4 Drawing Sheets

U.S. PATENT DOCUMENTS

| | | | |
|---|---|---|---|
| 4,165,022 A * | 8/1979 | Bentley et al. | 222/325 |
| 4,246,298 A | 1/1981 | Guarnery | |
| 4,302,648 A | 11/1981 | Sado et al. | |
| 4,340,057 A | 7/1982 | Bloch | |
| 4,442,019 A | 4/1984 | Marks | |
| 4,445,166 A * | 4/1984 | Berglund et al. | 363/48 |
| 4,554,229 A | 11/1985 | Small | |
| 4,865,197 A | 9/1989 | Craig | |
| 4,926,052 A | 5/1990 | Hatayama | |
| 4,937,119 A | 6/1990 | Nikles et al. | |
| 5,075,816 A | 12/1991 | Stormbom | |
| 5,173,835 A | 12/1992 | Cornett et al. | |
| 5,206,525 A | 4/1993 | Yamamoto et al. | |
| 5,259,926 A | 11/1993 | Kuwabara et al. | |
| 5,321,240 A | 6/1994 | Takahira | |
| 5,347,144 A | 9/1994 | Garnier et al. | |
| 5,364,735 A | 11/1994 | Akamatsu et al. | |
| 5,395,504 A | 3/1995 | Saurer et al. | |
| 5,480,839 A | 1/1996 | Ezawa et al. | |
| 5,486,851 A | 1/1996 | Gehner et al. | |
| 5,502,396 A | 3/1996 | Desarzens | |
| 5,528,222 A | 6/1996 | Moskowitz | |
| 5,546,889 A | 8/1996 | Wakita et al. | |
| 5,569,879 A | 10/1996 | Gloton | |
| 5,574,291 A | 11/1996 | Dodabalapur et al. | |
| 5,578,513 A | 11/1996 | Maegawa | |
| 5,580,794 A | 12/1996 | Allen | |
| 5,625,199 A | 4/1997 | Baumbach et al. | |
| 5,629,530 A | 5/1997 | Brown et al. | |
| 5,630,986 A | 5/1997 | Charlton et al. | |
| 5,652,645 A | 7/1997 | Jain | |
| 5,691,089 A | 11/1997 | Smayling | |
| 5,693,956 A | 12/1997 | Shi | |
| 5,705,826 A | 1/1998 | Aratani et al. | |
| 5,729,428 A | 3/1998 | Sakata et al. | |
| 5,731,691 A | 3/1998 | Noto | |
| 5,854,139 A | 12/1998 | Aratani et al. | |
| 5,869,972 A | 2/1999 | Birch et al. | |
| 5,883,397 A | 3/1999 | Isoda et al. | |
| 5,892,244 A | 4/1999 | Tanaka et al. | |
| 5,946,551 A | 8/1999 | Dimitrakopoulos et al. | |
| 5,967,048 A | 10/1999 | Fromson et al. | |
| 5,970,318 A | 10/1999 | Choi et al. | |
| 5,973,598 A | 10/1999 | Beigel | |
| 5,994,773 A | 11/1999 | Hirakawa | |
| 5,997,817 A | 12/1999 | Crismore et al. | |
| 5,998,805 A | 12/1999 | Shi et al. | |
| 6,036,919 A | 3/2000 | Thym et al. | |
| 6,045,977 A | 4/2000 | Chandross et al. | |
| 6,060,338 A | 5/2000 | Tanaka et al. | |
| 6,072,716 A | 6/2000 | Jacobson et al. | |
| 6,083,104 A | 7/2000 | Choi | |
| 6,087,196 A | 7/2000 | Sturm et al. | |
| 6,133,835 A | 10/2000 | De Leeuw et al. | |
| 6,150,668 A | 11/2000 | Bao | |
| 6,180,956 B1 | 1/2001 | Chondroudis | |
| 6,197,663 B1 | 3/2001 | Chandross | |
| 6,207,472 B1 | 3/2001 | Callegari et al. | |
| 6,215,130 B1 | 4/2001 | Dodabalapur | |
| 6,221,553 B1 | 4/2001 | Wolk | |
| 6,251,513 B1 | 6/2001 | Rector | |
| 6,284,562 B1 | 9/2001 | Batlogg et al. | |
| 6,291,126 B2 | 9/2001 | Wolk et al. | |
| 6,300,141 B1 | 10/2001 | Segal et al. | |
| 6,321,571 B1 | 11/2001 | Themont et al. | |
| 6,322,736 B1 | 11/2001 | Bao | |
| 6,329,226 B1 | 12/2001 | Jones | |
| 6,330,464 B1 | 12/2001 | Colvin | |
| 6,335,539 B1 | 1/2002 | Dimitrakopoulos et al. | |
| 6,340,822 B1 | 1/2002 | Brown et al. | |
| 6,344,662 B1 | 2/2002 | Dimitrakopoulos et al. | |
| 6,362,509 B1 | 3/2002 | Hart | |
| 6,366,017 B1 | 4/2002 | Antoniadis et al. | |
| 6,384,804 B1 | 5/2002 | Dodabalapur et al. | |
| 6,403,396 B1 | 6/2002 | Gudesen et al. | |
| 6,429,450 B1 | 8/2002 | Mutsaers et al. | |
| 6,498,114 B1 | 12/2002 | Amundson et al. | |
| 6,517,955 B1 | 2/2003 | Takada et al. | |
| 6,518,949 B2 | 2/2003 | Drzaic | |
| 6,521,109 B1 | 2/2003 | Bartic et al. | |
| 6,548,875 B2 | 4/2003 | Nishiyama | |
| 6,555,840 B1 | 4/2003 | Hudson | |
| 6,593,690 B1 | 7/2003 | McCormick | |
| 6,603,139 B1 | 8/2003 | Tessler | |
| 6,621,098 B1 | 9/2003 | Jackson | |
| 6,852,583 B2 | 2/2005 | Bernds et al. | |
| 6,903,958 B2 | 6/2005 | Bernds et al. | |
| 6,960,489 B2 | 11/2005 | Bernds et al. | |
| 7,078,937 B2 * | 7/2006 | Baude et al. | 326/112 |
| 2001/0026187 A1 | 10/2001 | Oku | |
| 2001/0046081 A1 | 11/2001 | Hayashi et al. | |
| 2002/0018911 A1 | 2/2002 | Bernius et al. | |
| 2002/0022284 A1 | 2/2002 | Heeger et al. | |
| 2002/0025391 A1 | 2/2002 | Angelopoulos | |
| 2002/0053320 A1 | 5/2002 | Duthaler et al. | |
| 2002/0056839 A1 | 5/2002 | Joo et al. | |
| 2002/0068392 A1 | 6/2002 | Lee et al. | |
| 2002/0130042 A1 | 9/2002 | Moerman et al. | |
| 2002/0170897 A1 | 11/2002 | Hall | |
| 2002/0195644 A1 | 12/2002 | Dodabalapur et al. | |
| 2003/0059987 A1 | 3/2003 | Sirringhaus Henning et al. | |
| 2003/0070500 A1 | 4/2003 | Hung | |
| 2003/0112576 A1 | 6/2003 | Brewer et al. | |
| 2003/0141807 A1 | 7/2003 | Kawase | |
| 2003/0178620 A1 | 9/2003 | Bernds et al. | |
| 2004/0002176 A1 | 1/2004 | Xu | |
| 2004/0013982 A1 | 1/2004 | Jacobson et al. | |
| 2004/0026689 A1 | 2/2004 | Bernds et al. | |
| 2004/0070500 A1 | 4/2004 | Pratt et al. | |
| 2004/0084670 A1 | 5/2004 | Tripsas et al. | |
| 2004/0211329 A1 | 10/2004 | Funahata et al. | |
| 2004/0233065 A1 | 11/2004 | Freeman | |
| 2004/0256467 A1 | 12/2004 | Clemens et al. | |

FOREIGN PATENT DOCUMENTS

| | | |
|---|---|---|
| DE | 33 38 597 | 5/1985 |
| DE | 41 03 675 | 8/1992 |
| DE | 692 32 740 T2 | 4/1993 |
| DE | 42 43 832 | 6/1994 |
| DE | 43 12 766 | 10/1994 |
| DE | 196 29 291 | 1/1997 |
| DE | 195 06 907 | 9/1998 |
| DE | 198 52 312 | 5/1999 |
| DE | 198 16 860 | 11/1999 |
| DE | 199 18 193 | 11/1999 |
| DE | 198 51 703 | 5/2000 |
| DE | 100 06 257 | 9/2000 |
| DE | 199 21 024 | 11/2000 |
| DE | 199 33 757 | 1/2001 |
| DE | 695 19 782 | 1/2001 |
| DE | 199 35 527 | 2/2001 |
| DE | 199 37 262 | 3/2001 |
| DE | 100 12 204 | 9/2001 |
| DE | 100 33 112 | 1/2002 |
| DE | 201 11 825 | 2/2002 |
| DE | 100 43 204 | 4/2002 |
| DE | 100 45 192 | 4/2002 |
| DE | 100 47 171 | 4/2002 |
| DE | 100 58 559 | 5/2002 |
| DE | 100 61 297 | 6/2002 |
| DE | 101 17 663 | 10/2002 |
| DE | 101 20 687 | 10/2002 |
| DE | 101 20 686 | 11/2002 |

| | | | | | | |
|---|---|---|---|---|---|---|
| DE | 101 51 440 | 2/2003 | | WO | WO 95/31831 | 11/1995 |
| DE | 101 41 440 | 3/2003 | | WO | WO 96/02924 | 2/1996 |
| DE | 101 63 267 | 7/2003 | | WO | WO 96/19792 | 6/1996 |
| DE | 102 09 400 | 10/2003 | | WO | WO 97/12349 | 4/1997 |
| DE | 102 19 905 | 12/2003 | | WO | WO 97/18944 | 5/1997 |
| DE | 103 41 962 | 4/2004 | | WO | WO 98/18156 | 4/1998 |
| DE | 699 13 745 | 10/2004 | | WO | WO 98/18186 | 4/1998 |
| EP | 0 108 650 | 5/1984 | | WO | WO 98/40930 | 9/1998 |
| EP | 0 128 529 | 12/1984 | | WO | WO 99/07189 | 2/1999 |
| EP | 0 268 370 A2 | 5/1988 | | WO | WO 99/10929 | 3/1999 |
| EP | 0 268 370 A3 | 5/1988 | | WO | WO 99/10939 | 3/1999 |
| EP | 0 350 179 | 1/1990 | | WO | WO 99/21233 | 4/1999 |
| EP | 0 418 504 | 3/1991 | | WO | WO 99/30432 | 6/1999 |
| EP | 0 442 123 | 8/1991 | | WO | WO 99/39373 | 8/1999 |
| EP | 0 460 242 | 12/1991 | | WO | WO 99/40631 | 8/1999 |
| EP | 0 501 456 A2 | 9/1992 | | WO | WO 99/53371 | 10/1999 |
| EP | 0 501 456 A3 | 9/1992 | | WO | WO 99/54842 | 10/1999 |
| EP | 0 511 807 | 11/1992 | | WO | WO 99/54936 | 10/1999 |
| EP | 0 528 662 | 2/1993 | | WO | WO 99/66540 | 12/1999 |
| EP | 0 603 939 A2 | 6/1994 | | WO | WO 00/07151 | 2/2000 |
| EP | 0 615 256 | 9/1994 | | WO | WO 00/33063 | 6/2000 |
| EP | 0 685 985 | 12/1995 | | WO | WO 00/36666 | 6/2000 |
| EP | 0 716 458 A2 | 6/1996 | | WO | WO 00/79617 | 12/2000 |
| EP | 0 716 458 A3 | 6/1996 | | WO | WO 01/03126 | 1/2001 |
| EP | 0 785 578 A2 | 7/1997 | | WO | WO 01/06442 | 1/2001 |
| EP | 0 785 578 A3 | 7/1997 | | WO | WO 01/08241 | 2/2001 |
| EP | 0 786 820 | 7/1997 | | WO | WO 01/15233 | 3/2001 |
| EP | 0 690 457 | 12/1999 | | WO | WO 01/17029 | 3/2001 |
| EP | 0 962 984 A2 | 12/1999 | | WO | WO 01/17041 | 3/2001 |
| EP | 0 962 984 A3 | 12/1999 | | WO | WO 01/27998 | 4/2001 |
| EP | 0 966 182 | 12/1999 | | WO | WO 01/46987 | 6/2001 |
| EP | 0 979 715 | 2/2000 | | WO | WO 01/47044 A2 | 6/2001 |
| EP | 0 981 165 | 2/2000 | | WO | WO 01/47044 A3 | 6/2001 |
| EP | 0 989 614 A2 | 3/2000 | | WO | WO 01/47045 | 6/2001 |
| EP | 1 048 912 | 11/2000 | | WO | WO 01/69517 | 9/2001 |
| EP | 1 052 594 | 11/2000 | | WO | WO 01/73109 A2 | 10/2001 |
| EP | 1 065 725 A2 | 1/2001 | | WO | WO 01/73109 A3 | 10/2001 |
| EP | 1 065 725 A3 | 1/2001 | | WO | WO 02/05360 | 1/2002 |
| EP | 1 083 775 | 3/2001 | | WO | WO 02/05361 | 1/2002 |
| EP | 1 102 335 A2 | 5/2001 | | WO | WO 02/15264 | 2/2002 |
| EP | 1 103 916 | 5/2001 | | WO | WO 02/17233 | 2/2002 |
| EP | 1 104 035 A2 | 5/2001 | | WO | WO 02/19443 | 3/2002 |
| EP | 1 113 502 | 7/2001 | | WO | WO 02/21612 | 3/2002 |
| EP | 1 134 694 | 9/2001 | | WO | WO 02/29912 | 4/2002 |
| EP | 1 170 851 | 1/2002 | | WO | WO 03/027948 | 4/2002 |
| EP | 1 224 999 | 7/2002 | | WO | WO 02/43071 | 5/2002 |
| EP | 1 237 207 | 9/2002 | | WO | WO 02/47183 | 6/2002 |
| EP | 1 296 280 | 3/2003 | | WO | WO 02/065557 A1 | 8/2002 |
| EP | 1 318 084 | 6/2003 | | WO | WO 02/071139 | 9/2002 |
| FR | 2793089 | 11/2000 | | WO | WO 02/071505 | 9/2002 |
| GB | 723598 | 2/1955 | | WO | WO 02/076924 | 10/2002 |
| GB | 2 058 462 | 4/1981 | | WO | WO 02/091495 A2 | 11/2002 |
| JP | 54069392 | 6/1979 | | WO | WO 02/091495 A3 | 11/2002 |
| JP | 60117769 | 6/1985 | | WO | WO 02/095805 A2 | 11/2002 |
| JP | 61001060 | 1/1986 | | WO | WO 02/095805 A3 | 11/2002 |
| JP | 61167854 | 7/1986 | | WO | WO 02/099907 | 12/2002 |
| JP | 62065472 A | 3/1987 | | WO | WO 02/099908 | 12/2002 |
| JP | 362065477 A | 3/1987 | | WO | WO 03/036686 | 5/2003 |
| JP | 63205943 | 8/1988 | | WO | WO 03/038897 | 5/2003 |
| JP | 01169942 | 7/1989 | | WO | WO 03/046922 | 6/2003 |
| JP | 2969184 | 12/1991 | | WO | WO 03/057501 | 7/2003 |
| JP | 03290976 A | 12/1991 | | WO | WO 03/067680 | 8/2003 |
| JP | 05152560 | 6/1993 | | WO | WO 03/069552 | 8/2003 |
| JP | 05259434 | 10/1993 | | WO | WO 03/081671 | 10/2003 |
| JP | 05347422 | 12/1993 | | WO | WO 03/095175 | 11/2003 |
| JP | 08197788 | 8/1995 | | WO | WO 2004/032257 | 4/2004 |
| JP | 09083040 | 3/1997 | | WO | WO 2004/042837 A2 | 5/2004 |
| JP | 09320760 | 12/1997 | | WO | WO 2004/042837 A3 | 5/2004 |
| JP | 10026934 | 1/1998 | | WO | WO 2004/047144 A2 | 6/2004 |
| JP | 2001085272 | 3/2001 | | WO | WO 2004/047144 A3 | 6/2004 |
| WO | WO 93/16491 | 8/1993 | | WO | WO 2004/047194 A2 | 6/2004 |
| WO | WO 94/17556 | 8/1994 | | WO | WO 2004/047194 A3 | 6/2004 |
| WO | WO 95/06240 | 3/1995 | | WO | WO 2004/083859 | 9/2004 |

WO WO 2005/004194 1/2005

OTHER PUBLICATIONS

U.S. Appl. No. 10/344,951, filed Feb. 12, 2004, Adolf Bernds et al.
U.S. Appl. No. 10/380,113, filed Sep. 25, 2003, Adolf Bernds et al.
U.S. Appl. No. 10/381,032, filed Feb. 12, 2004, Adolf Bernds et al.
U.S. Appl. No. 10/433,961, filed Apr. 1, 2004, Wolfgang Clemens et al.
U.S. Appl. No. 10/451,108, filed May 13, 2004, Mark Giles et al.
U.S. Appl. No. 10/473,050, filed May 20, 2004, Adolf Bernds et al.
U.S. Appl. No. 10/479,234, filed Dec. 30, 2004, Adolf Bernds et al.
U.S. Appl. No. 10/479,238, filed Oct. 20, 2004, Adolf Bernds et al.
U.S. Appl. No. 10/492,922, filed Mar. 3, 2005, Erwann Buillet et al.
U.S. Appl. No. 10/492,923, filed Dec. 23, 2004, Wolfgang Clemens et al.
U.S. Appl. No. 10/508,737, filed May 19, 2005, Adolf Bernds et al.
U.S. Appl. No. 10/517,750, filed Oct. 13, 2005, Wolfgang Clemens et al.
U.S. Appl. No. 10/523,216, filed Feb. 2, 2006, Adolf Bernds et al.
U.S. Appl. No. 10/523,487, filed Apr. 13, 2006, Wolfgang Clemens et al.
U.S. Appl. No. 10/524,646, filed May 11, 2006, Walter Fix et al.
U.S. Appl. No. 10/533,756, filed Jun. 8, 2006, Wolfgang Clemens et al.
U.S. Appl. No. 10/534,678, filed Jun. 8, 2006, Wolfgang Clemens et al.
U.S. Appl. No. 10/535,448, filed Jun. 8, 2006, W. Clemens et al.
U.S. Appl. No. 10/535,449, filed Feb. 16, 2006, Walter Fix et al.
U.S. Appl. No. 10/541,815, filed Jun. 8, 2006, Axel Gerlt et al.
U.S. Appl. No. 10/541,956, N/A, Wolfgang Clemens et al.
U.S. Appl. No. 10/541,957, filed Jul. 6, 2006, Walter Fix et al.
U.S. Appl. No. 10/543,561, N/A, Wolfgang Clemens et al.
U.S. Appl. No. 10/542,678, N/A, Adolf Bernds et al.
U.S. Appl. No. 10/542,679, filed Mar. 16, 2006, Adolf Bernds et al.
U.S. Appl. No. 10/562,989, N/A, Jurgen Ficker et al.
U.S. Appl. No. 10/562,869, N/A, Wolfram Glauert.
U.S. Appl. No. 10/569,763, N/A, Walter Fix et al.
U.S. Appl. No. 10/568,730, N/A, Wolfgang Clemens et al.
U.S. Appl. No. 10/569,233, N/A, Adolf Bernds et al.
U.S. Appl. No. 10/570,571, N/A, Clemens et al.
U.S. Appl. No. 10/585,775, N/A, Walter Fix et al.
U.S. Appl. No. 11/574,139, N/A, Jurgen Ficker et al.
U.S. Appl. No. 11/721,284, N/A, Markus Bohm et al.
U.S. Appl. No. 11/721,219, N/A, Wolfgang Clemens et al.
U.S. Appl. No. 11/721,244, N/A, Robert Blache et al.
U.S. Appl. No. 11/722,457, N/A, Markus Bohm et al.
U.S. Appl. No. 11/817,258, N/A, Andreas Ullmann et al.
U.S. Appl. No. 11/817,329, N/A, Andreas Ullmann et al.
Angelopoulos M et al., "In-Situ Radiation Induced Doping", Mol. Crystl. Liq. Cryst., 1990, vol. 189, pp. 221-225.
Assadi A, et al:, Field-Effect Mobility of Poly (3-Hexylthiophene) Dept. of Physics and Measurement Technology, Received Mar. 3, 1988; accepted for Publication May 17, 1988.
Bao, Z. et al., "High-Performance Plastic Transistors Fabricatecd by Printing Techniques", Chem. Mater vol. 9, No. 6, 1997, pp. 1299-1301.
Bao, Z. et al. "Organic and Polymeric Materials for the Fabrications of Thin Film Field-Effect Transistors", paper presented at the meeting of American Chemical Society, Division of Polymer Chemistry, XX, XX, vol. 39, No. 1, Mar. 29, 1998.
Baude P F et al, "Organic semiconductor RFID transponsers" International Electron Devices Meeting 2003. IEDM. Technical Digest. Washington, DC, Dec. 8-10, 2003, New York NY, IEEE, US Dec. 8, 2003, pp. 191-194.
Belloni, F. et al., "Parameters Optimization for Improved Dynamics of Voltage Multipliers for Space", 2004 35th Annual IEEE Electronics Specialists Conference, Aachen, Germany, 2004, pp. 439-442.
Bonse M. et al., "Integrated a-Si:H/Pentacene Inorganic Organic Complementary Circuits" in IEEE IEDM 98, pp. 249-252.
Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.
Brabec, C.J. et al., "Photovoltaic properties of a conjugated polymer/ methanofullerene composites embedded in a polystyrene matrix", Journal of Applied Physics, vol. 85, No. 9, 1999, pp. 6866-6872.
Braun D., et al, "Visible light emission from semiconducting polymer diodes", American Institute of Physics, Applied Physics Letters 58, May 6, 1991, pp. 1982-1984.
Brown, A.R. et al., "Field-effect transistors made from solution-processed organic semiconductors", Elsevier Science, S.A., Synthetic Metals 88 (1997) pp. 37-55.
Brown, A.R., "Logic Gates Made from Polymer Transistors and Their Use in Ring Oscillators", Science, vol. 270, Nov. 10, 1995, pp. 972-974.
Chen, Shiao-Shien et al:, "Deep Submicrometer Double-Gate Fully-Depleted SOI PMOS Devices: A Concise Short-Channel Effect Threshold Voltage Model Using a Quasi-2D Approach", IEEE Transaction on Electron Devices, vol. 43, No. 9, Sep. 1996.
Chen, X.L. et al., "Morphological and Transistor Studies of Organic Molecular Semiconductors with Arisotropic Electrical Characteristics", American Chemical Society, 2001, Chem. Mater. 2001, 13, 1341-1348.
Clemens, W. et al., "Vom Organischen Transistor Zum Plastik-Chip," Physik Journal V. 2, 2003, pp. 31-36.
Collet J. et al:, Low Voltage, 30 Nm Channel Length, Organic Transistors With a Self-Assembled Monolayer As Gate Insulating Films:, Applied Physics Letters, American Institute of Physics. New York, US, Bd 76, Nr. 14, Apr. 3, 2000, Seiten 1941-1943, XP000950589, ISSN:0003-6951, das ganze Dokument.
Cox, Robert W. et al., "A Minimally Intrusive, Low Cost System for Determining Indoor Air Flow Patterns", Computers in Power Electronics, 2004. IEEE Workshop on Urbana, IL Aug. 15-18, 2004, Piscataway, NJ, IEEE, Aug. 15, 2004, pp. 63-68.
Crone, B. et al, "Large-scale complementary Integrated circuits based on Organic transistors", Nature, vol. 403, Feb. 3, 2000, pp. 521-.
Crone B. K. et al., "Design and Fabrication of Organic Complementary Circuits", J. Appl. Phys. vol. 89, May 2001, pp. 5125-5132.
Dai, L. et al, Photochemical Generation of Conducting Patterns in Polybutadiene Films: Macromolecules, vol. 29, No. 1, 1996, pp. 282-287, XP 001042019, the whole document.
Dai, L. et al., "Conjugation of Polydienes by Oxidants Other Than Iodine", Elsevier Science S.A., Synthetic Metals 86 (1997) 1893-1894.
Dai, L. et al., "$I_2$-Doping" of 1,4-Polydienes*, Elsevier Science S.A., Synthetic Metals 69 (1995) pp. 563-566.
De Leeuw C.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.
Dodabalapur, A. et al., Organic smart pixels, American Institute of Physics, Applied Physics Letters, vol. 73, No. 2, Jul. 13, 1998, pp. 142-144.
Drury et al., "Low-Cost All-Polymer Integrated Circuits", American Institute of Physics, Applied Physics Letters, 1998, vol. 73, No. 1, pp. 108-110, Jul. 6, 1998.
Ficker, J. et al., "Dynamic and Lifetime Measurements of Polymer OFETS andIntegrated Plastic Circuits," Proc. of Spie, v. 466, 2001, pp. 95-102.
Fix, W. et al., "Fast Polymer Integrated Circuits Based on a Polyfluorene Derivative", ESSDERC, 2002, pp. 527-529.
Fix, W., et al., "Fast polymer integrated circuits", American Institute of Physics, Applied Physics Letters, vol. 81, No. 89, Aug. 2002, pp. 1735-1737.
Forrest et al.: "The Dawn of Organic Electronics", IEEE Spectrum, Aug. 2000, Seiten 29-34, XP002189000, IEEE Inc., New York, US ISSN:0018-9235, Seite 33, rechte Spalte, Zelle 58-Seite 34, linke Spalte, Zeile 24; Abbildung 5.
Fraunhofer Magazin- Polytronic Chips Von der Rolle, 4.2001, pp. 8-13.
Garbassi F., et al., "Bulk Modifications", Polymer Surfaces, John Wiley & Sons, 1998, pp. 289-300.

Garnier F et al:, "Vertical Devices Architecture by Molding of Organic-Based Thin Film Transistor", Applied Physics Letters, American Institute of Physics. XP000784120, issn: 0003-6951 abbildung 2.

Garnier, F. et al, "All-Polymer Field-Effect Transistor Realized by Printing Techniques", Science, American, Association for the Advancement of Science, US, vol. 265, Sep. 1994, pp. 1684-1686.

Garnier et al., "Conjugated Polymers and Oligomers as Active Material for Electronic Devices", Synthetic Metals, vol. 28, 1989.

Gelinck, G.H. et al., "High-Performance All-Polymer Integrated Circuits", Applied Physics Letters, v. 77, 2000, pp. 1487-1489.

Goncalves_Conto, Sylvie, et al., "Interface Morphology in Organic Light-Emitting Diodes", Advanced Materials 1999, vol. 11, No. 2, pp. 112-115.

Gosain, D.P., "Excimer laser crystallized poly-Si TFT's on plastic substrates", Second International Symposium on Laser Precision Microfabrication, May 16-18, 2001, Singapore, vol. 4426, pp. 394-400.

Halls, J.J. M., et al., "Efficient photodiodes from interpenetrating polymer networks", Nature, vol. 376, Aug. 10, 1995, pp. 498-500.

Harsanyi G. et al, "Polytronics for biogtronics:unique possibilities of polymers in biosensors and BioMEMS", IEEE Polytronic 2002 Conference, Jun. 23, 2002, pp. 211-215.

Hart, C.M. et al, "Low-cost all-polymer integrated circuits", Solid-State Circuits Conference, 1998. EXXCIRC '98 Proceedings of the 24th European, The Hague, The Netherlands Sep. 22-24, 1998, Piscataway, NJ, USA, IEEE, Sep. 22, 1998, pp. 30 -34.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Hergel, H. J.: "Pld-Programmiertechnologien", Elektronik, Franzis Verlag Gmbh. Munchen, DE, Bd 41, Nr. 5, Mar. 3, 1992, Seiten 44-46, XP000293121, ISSN: 0013-5658, Abbildungen 1-3.

Hwang J D et al:, "A Vertical Submicron Slc thin film transistor", Solid State Electronics, Elsevier Science Publishers, Barking, GB, Bd. 38, Nr. 2,Feb. 1, 1995, Seiten 275-278, XP004014040, ISSN:0038-1101, Abbildung 2.

IBM Technical Disclosure Bulletin, "Short-Channel Field-Effect Transistor", IBM Corp., New York, US, Bd. 32, Nr. 3A, Aug. 1, 1989, Seiten 77-78, XP000049357, ISSN:0018-8689, das ganze Dokument.

Kawase, T., et al., "Inkjet Printed Via-Hole Interconnections and Resistors for All-Polymer Transistor Circuits", Advanced Materials 2001, 13, No. 21, Nov. 2, 2001, pp. 1601-1605.

Kind, D., "Einfuhrung in die Hochspannungs-Versuchstechnik", Friedrich. Vieweg & Sohn, Braunschweig/Wiesbaden, pp. 16-21.

Klauk, H. et al., "Fast Organic Thin Film Transistor Circuits", IEEE Electron Device Letters, vol. 20, No. 6, pp. 289-291.

Klauk, H. et al., "Pentacene Thin Film Transistors and Inverter Circuits", 1997 International Electron Devices Meeting Technical Digest, pp. 539-542, Dec. 1997.

Knobloch, A. et al., "Printed Polymer Transistors", Proc. Polytronic, v. 84, 2001, pp. 84-89.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Koezuka, H. et al., "Macromolecular Electronic Device", Mol. Cryst. Liq. Cryst. 1994, vol. 2555, pp. 221-230.

Kuhlmann et al., "Terabytes in Plastikfolie", Organische Massenspeicher vor der Serienproduktion.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Lidzey, D. G. et al., "Photoprocessed and Micropatterned Conjugated Polymer LEDs", Synthetic Metals, V. 82, 1996, pp. 141-148.

Lowe, J. et al., "Poly (3-(2-Acetoxyethyl)Thiophene): A Model Polymer for Acid-Catalyzed Lithography", Synthetic Metals, Elsevier Sequoia, Lausanne, Ch, Bd. 85, 1997, Seiten 1427-1430.

Lu, Wen et al., "Use of Ionic Liquids for π-Conjugated Polymer Electrochemical Devices", Science, vol. 297, 2002, pp. 983-987/.

Lucent Technologies, "Innovation marks significant milestone in the development of electronic paper", Cambridge, MA and Murray Hill, NJ, Nov. 20, 2000. XP-002209726.

Manuelli, Alessandro et al., "Applicability of Coating Techniques for the Production of Organic Field Effect Transistors", IEEE Polytronic 2002 Conference, 2002, pp. 201-204.

Marko, H., Vorlesungsmanuskript "Nachrichtentechnik 2 (Modulationsverfahren" des Lehrstuhls fur Nachrichtentechnik der Technischen Universitat Munchen, 1989.

Miyamoto, Shoichi et al:, Effect of LDD Structure and Channel Poly-Si Thinning on a Gate-All-Around TFT (GAT) for SRAM's, IEEE Transactions on Electron Devices. vol. 46, No. 8, Aug. 1999.

Nalwa, H.S., "Organic Conductive Molecules and Polymers", vol. 2, 1997, pp. 534-535.

"Nachrichtentechnik 2 (Modulationsverfahren)" des Lehrstuhls fur Nachrichtentechnik der Technischen Universitat Munchen, 1989.

Oelkrug, D. et al., "Electronic spectra of self-organized oligothiophene films with 'standing' and 'lying' molecular units", Elsevier Science S.A., 1996, Thin Solid Films 284-270.

Qiao, X. et al., "The FeCl3-doped poly3-alkithiophenes) in solid state", Elsevier Science, Synthetic Metals 122 (2001) pp. 449-454.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogers J a et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Roman et al., "Polymer Diodes With High Rectification", Applied Physics Letters, vol. 75, No. 21, Nov. 22, 1999.

Rost, Henning et al., "All-Polymer Organic Field Effect Transistors", Proc. Mat. Week, CD, 2001, pp. 1-6.

Sandberg, H. et al, "Ultra-thin Organic Films for Field Effect Transistors", SPIE vol. 4466, 2001, pp. 35-43.

Schoebel, "Frequency Conversion with Organic-On-Inorganic Heterostructured Diodes", Extended Abstracts of the International Conference on Solid State Devices and Materials, Sep. 1, 1997.

Schrodner M. et al., "Plastic electronics based on Semiconducting Polymers", First International IEEE Conference on Polymers and Adhesives in Microelectronics and Photonics. Incorporating Poly, Pep & Adhesives in Electronics. Proceedings (Cat. No. 01TH8592), First International IEEE Conference on Polymers and Adhesives in Micr, Seiten 91-94.

Shaheen, S.E., et al., "Low band-gap polymeric photovoltaic devices", Synthetic Metals, vol. 121, 2001, pp. 1583-1584.

Speakman, S.P. et al., High performance organic semiconducting thin films: Ink Jet printed polythophene [rr-P3HT], Organic Electronics 2 (2), 2001, pp. 65-73.

Takashima, W. et al., Electroplasticity Memory Devices Using Conducting Polymers and Solid Polymer Electrolytes, Polymer International, Melbourne, 1992, pp. 249-253.

Ullman, A. et al., "High Performance Organic Field-Effect Transistors and Integrated Inverters", Mat. Res. Soc. Symp. Proc., v. 665, 2001, pp. 265-270.

Velu, G. et al. "Low Driving Voltages and Memory Effect in Organic Thin-Film Transistors With a Ferroelectric Gate Insulator", Applied Physics Letters, American Institute of Physics, New York, vol. 79 No. 5, 2001, pp. 659-661.

Wang, Hsing et al., "Conducting Polymer Blends: Polythiophene and Polypyrrole Blends with Polystyrene and Poly(bisphenol A carbonate)", Macromolecules, 1990, vol. 23, pp. 1053-1059.

Wang, Yading et al., "Electrically Conductive Semiinterpenetrating Polymer Networks of Poly(3-octylthiophene)", Macromolecules 1992, vol. 25, pp. 3284-3290.

Yu, G. et al., "Dual-function semiconducting polymer devices: Light-emitting and photodetecting diodes", American Institute of Physics, Applied Physics Letter 64, Mar. 21, 1994, pp. 1540-1542.

Zangara L., "Metall Statt Halbleiter, Programmierung Von Embedded ROMS Ueber Die Metallisierungen", Elektronik, Franzis Verlag GmbH, Munchen, DE, vol. 47, No. 16, Aug. 4, 1998, pp. 52-55.

Zheng, Xiang-Yang et al., "Electrochemical Patterning of the Surface of Insulators with Electrically Conductive Polymers", J. Electrochem. Soc., v. 142, 1995, pp. L226-L227.

Zie Voor Titel Boek, d 2e PAGINA, XP-002189001, p. 196-228.

* cited by examiner

ORGANIC RECTIFIER

The invention relates to a rectifier having at least two organic diodes or organic field effect transistors, which is employed for example as a rectifier of an RFID transponder (RFID=Radio Frequency Identification), and to an electronic device in the form of a flexible, multilayer film body.

RFID transponders are increasingly being employed for providing merchandise, articles or security products with information that can be read out electronically. They are thus being employed for example as electronic bar code for consumer goods, as luggage tag for identifying luggage or as security element that is incorporated into the binding of a passport and stores authentication information.

RFID transponders usually comprise two components, an antenna and a silicon chip. The RF carrier signal transmitted by a base station is coupled into the antenna resonant circuit of the RFID transponder. The silicon chip modulates an additional item of information onto the signal fed back to the base station. In this case, the RFID transponder is not usually provided with an independent power source. Power is supplied to the silicon chip by means of a rectifier which converts the RF carrier signal coupled into the antenna resonant circuit into a DC voltage and thus additionally uses it as a power source for the silicon chip.

In order to be able to reduce the production costs for RFID transponders, it has been proposed to use organic integrated circuits on the basis of organic field effect transistors in RFID transponders. Thus, WO 99/30432 for example, proposes using an integrated circuit constructed substantially from organic material in an RFID transponder, said integrated circuit providing the function of an ID code generator. The ID code generator is fed with a supply voltage by means of two rectifier diodes coupled to the antenna resonant circuit. Said rectifier diodes, downstream of which a smoothing capacitor is connected, comprise two specially interconnected field effect transistors.

Although the use of such specially interconnected field effect transistors makes it possible to realize rectifier diodes by means of organic components, if organic field effect transistors are connected up in this way in order to use them as rectifier diodes, the frequency that can be picked up by said diodes is very limited since the organic field effect transistors generally switch significantly more slowly than the RF carrier frequency.

Typical frequency ranges used for RFID transponders are e.g. 125 to 135 kHz, 13 to 14 MHz, 6 to 8 MHz, 20 to 40 MHz, 860 to 950 MHz or 1.7 to 2.5 GHz. However, organic circuits are significantly slower than all silicon-based circuits since organic semiconductors generally have a lower charge carrier mobility than silicon and organic field effect transistors are based on the principle of charge carrier accumulation rather than on the principle of charge carrier inversion. This results in a lower switching speed in comparison with silicon transistors and a different switching behavior (e.g. unsuitability for AC voltage). If organic field effect transistors as described in WO 99/30342 are thus connected up to form a rectifier, the rectifier thus realized switches significantly more slowly (less than 100 kHz) than the transmission frequency of the carrier signal emitted by the base station.

It is furthermore proposed in WO 02/21612 to construct an organic rectifier in which at least one of the pn-doped conductive layers a conventional pn semiconductor diode is supplemented or replaced by an organically conductive material. It is furthermore proposed, in a conventional metal-semiconductor diode (Schottky diode) to replace at least one layer by an organic layer. The choice of dimensions of the capacitive areas of this rectifier makes it possible to set the switching frequency of the switching rectifier. A description is furthermore given of connecting a smoothing capacitor downstream of a rectifier constructed from such organic components, which smoothing capacitor smooths the DC voltage arriving in pulsating fashion downstream of the rectifier and is connected up in parallel with the load resistor.

However, such organic rectifiers, too, are not very effective at frequencies above 1 MHz. This is attributable to the low mobility of the organic semiconductors which are available nowadays and which can be used in such an organic rectifier. The space charge zone leading to the rectifying effect is no longer built up rapidly enough at high frequencies on account of the low charge carrier mobility in the organic semiconductor. The efficiency of the rectifier decreases as a result of this, which makes it more difficult to supply downstream loads with DC voltage.

The invention is based on the object, then, of improving the supply of downstream loads by an organic rectifier.

This object is achieved by a rectifier for converting an AC voltage present between two input terminals of the rectifier into a DC voltage, which rectifier has at least two organic diodes and/or organic field effect transistors each having at least one electrical functional layer composed of a semiconducting organic material and also two or more charging or charge-reversal capacitors which are connected up to the two or more organic diodes or organic field effect transistors in such a way that the charging or charge-reversal capacitors can be charged via different current paths. This object is furthermore achieved by an electronic device in the form of a flexible, multilayer film body, which electronic device has a voltage source and a rectifier configured in the manner described above, said rectifier being fed by the voltage source.

In this case, the invention is based on the concept of compensating for the low charge carrier mobility of organic semiconductors by the interconnection with two or more charging or charge-reversal capacitors which are charged via different current paths of the rectifier.

The above-described interconnection of organic components and capacitors to form an organic rectifier enables the rectification factor $GRS=U_=/U_~$ to be significantly increased. Experiments have thus shown, for example, that by means of a conventional organic half-wave rectifier at a frequency of 13.56 MHz, for example, only approximately 5% of the AC voltage amplitude $U_~$ fed in is converted into a DC voltage $U_=$ at the output, which corresponds to a rectification factor of $GRV=U_=/U_~=0.05$, such that downstream loads can be supplied with DC voltage only with very great difficulty. Thus, the possibility of the rectification of coupled-in HF signals (HF=high frequency) by means of organic components is deemed impossible at the present time even by many experts, the use of organic rectifiers in RFID transponders is rejected and this is accounted for by the low charge carrier mobility in the organic semiconductors known at the present time. The invention provides a remedy here and makes it possible, through the interconnection referred to above of organic components with charging or charge-reversal capacitors, to provide an organic rectifier which can supply downstream loads with the required DC voltage even at high frequencies. In this case, possible loads include organic logic circuits, display elements and also conventional electronics.

In this case, the rectifier according to the invention comprises a multilayer construction composed of two, three or more layers, at least one layer of which is an active layer composed of organic semiconductor material. In this case, an organic diode realized in this multilayer construction has a metal-semiconductor junction or a pn junction with organic semiconductors, in which case the metal can also be replaced by an organic conductor. In this case, the sequence of the individual functional layers can be arranged both vertically and laterally. For improving the electrical properties—e.g. injection of charge carriers—, it is also conceivable to introduce additional interlayers which supplement the actual functional layers.

Moreover, it is also possible for organic field effect transistors whose gate electrode is connected to the source or drain electrode to be used as organic diodes in the rectifier.

Advantageous developments of the invention are referred to in the subclaims.

In accordance with the first exemplary embodiment of the invention, a first charging capacitor and a first organic diode are arranged in a first conducting line branch and a second charging capacitor and a second organic diode are arranged in a second conducting line branch. The first and the second conducting line branch are coupled in a parallel arrangement to the input of the rectifier, the first and the second organic diode being connected up in a back-to-back arrangement of the respective anode and cathode in the first and respectively the second conducting line branch.

In accordance with a further exemplary embodiment of the invention, a first organic diode and a second organic diode are connected in a back-to-back arrangement of the respective anode and cathode via a charge-reversal capacitor to the first input terminal of the rectifier. The first organic diode is connected to the second input terminal of the rectifier. The second organic diode is connected via a charging capacitor to the second input terminal of the rectifier. In accordance with this arrangement, the cathode of the first organic diode and the anode of the second organic diode can thus be connected via the charge-reversal capacitor to the first input terminal, such that the anode of the first organic diode and the cathode of the second organic diode are connected to one another via the charging capacitor and the anode of the first organic diode is connected to the second input terminal. However, the anode of the first organic diode and the cathode of the second organic diode can also be connected via the charge-reversal capacitor to the first input terminal, such that the cathode of the first organic diode and the anode of the second organic diode are connected to one another via the charging capacitor and the anode of the first organic diode is connected to the second input terminal.

Organic rectifiers constructed in this way have the advantage that even with a low outlay it is possible to achieve an increase in the supply voltage that can be obtained on the output side. The organic rectifier can thus be fabricated particularly cost-effectively, for example by means of a roll-to-roll process.

A further increase in the supply voltage available on the output side can be obtained by constructing the rectifier from two or more stages which are connected up to one another. Each stage of the rectifier comprises two charging or charge-reversal capacitors and two organic diodes or organic field effect transistors which are connected up in such a way that the charging or charge-reversal capacitors can be charged via different current paths and they have in each case two input terminals and two coupling terminals for coupling input terminals of a further stage.

The rectifier can in this case be constructed from two or more stages of identical type which are connected up in cascading fashion.

In one particularly advantageously constructed stage which can be used for such cascading, the cathode of the first organic diode and the anode of the second organic diode are connected to the first coupling terminal of the first stage and via the charge-reversal capacitor to the first input terminal of the first stage. The anode of the first organic diode and the cathode of the second organic diode are connected to one another via the charging capacitor. The anode of the first organic diode is connected to the second input terminal of the stage and the cathode of the second organic diode is connected to the second coupling terminal of the stage. A stage constructed in this way is referred to hereinafter as "first stage".

Furthermore, it is also possible for the anode of the first organic diode and the cathode of the second organic diode to be connected to the first coupling terminal of the stage and via the charge-reversal capacitor to the first input terminal of the stage. The cathode of the first organic diode and the anode of the second organic diode are connected to one another via the charging capacitor. The cathode of the first organic diode is connected to the second input terminal of the stage and the anode of the second organic diode is connected to the second coupling terminal of the stage. A stage constructed in this way is referred to hereinafter as "second stage".

In the cascading of first stages or second stages, the first and second input terminals of the foremost stage form the first and respectively the second input terminal of the rectifier. The coupling terminals of the respective stage are connected to the input terminals of the downstream stage, provided that the respective stage does not form the last stage of the rectifier. The output of the rectifier is formed by the second input terminal of the foremost stage and by the second coupling terminal of the last stage.

Furthermore, it is also possible for first and second stages to be connected up to one another in a rectifier. In a rectifier constructed in this way, the first and second input terminals of a first stage and of a second stage are connected to one another and form the input terminals of the rectifier. An arbitrary number of first and second stages are subsequently connected in the manner described above in each case to the coupling terminals of the preceding first and respectively second stage. The output of the rectifier is formed by the second coupling terminal of the last first stage and by the second coupling terminal of the last second stage.

The advantage of such an arrangement of two different types of stages is that—for the same supply voltage—the DC current that can be made available to the downstream load can be increased.

The rectification factor can furthermore be increased by using as organic diodes organic components which have an interlayer for lowering the parasitic capacitance of the organic diode. As a result of the reduction of the parasitic capacitances of the organic diodes, the effectiveness of the charging/charge-reversal processes at the charging or charge-reversal capacitors is improved and the efficiency of the rectifier is thus increased.

In accordance with a further exemplary embodiment of the invention, the first and/or the second input terminal of the rectifier is connected via one or a plurality of first organic field effect transistors to a charge-reversal capacitor. The charge-reversal capacitor is connected via one or a plurality of second field effect transistors to a charging capacitor. The one or the plurality of first and second field effect transistors are driven by a logic circuit. In this case, the logic circuit drives the first field effect transistors in such a way that an alternating voltage is applied to the charge-reversal capacitor.

Particular advantages are afforded when a rectifier according to the invention is used in an electronic device having, as voltage source, a resonant circuit comprising an antenna and a capacitor. By coupling such an antenna resonant circuit to a rectifier according to the invention, a DC voltage supply of downstream electronic assemblies can be provided which can be produced particularly cost-effectively, provides a sufficient supply voltage and can be realized in the form of a flexible body. Particular advantages are furthermore afforded if an organic integrated circuit is used as downstream electronic assembly. On account of the particular characteristic of organic integrated circuits (e.g. very low current requirement), such a circuit is matched particularly well to the characteristic of the rectifier according to the invention. Furthermore, an electronic device of this type can be manufactured cost-effectively for mass production applications and disposable products using a uniform manufacturing technology.

In addition to the use of such a resonant circuit as a voltage source, it is also possible to provide an oscillator, for example a ring oscillator, in the voltage source or to apply an alternating voltage to the charging and/or charge-reversal capacitors through corresponding driving of two or more field effect transistors.

The invention is explained by way of example below on the basis of a plurality of exemplary embodiments with the aid of the accompanying drawing.

Figure 1:
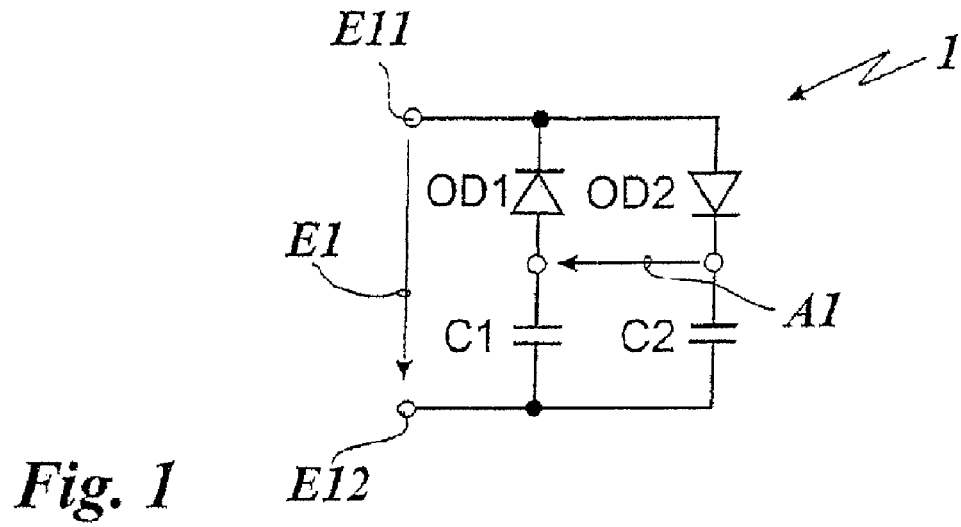
FIG. 1 shows a block diagram of an organic rectifier in accordance with a first exemplary embodiment.

The rectifiers illustrated in the figures FIG. 1 to FIG. 5 each comprise a flexible, multilayer film body having one or a plurality of electrical functional layers. The electrical functional layers of the film body comprise (organically) conductive layers, organically semiconducting layers and/or organic insulating layers which, at least partly in structured form, are arranged one above another. Alongside these electrical functional layers, the multilayer film body optionally also comprises one or a plurality of carrier layers, protective layers, decorative layers, adhesion promoting layers or adhesive layers. The electrically conductive functional layers preferably comprise a conductive, structured metallization, preferably composed of gold or silver. However, provision may also be made for forming said functional layers from an inorganic electrically conductive material, for example for forming them from indium tin oxide or from a conductive polymer, for example from polyaniline or polypyrrole. The organically semiconducting functional layers comprise for example conjugated polymers, such as polythiophenes, polythienylenevinylenes or polyfluorene derivatives, which are applied as a solution by spin-coating, blade coating or printing. So-called "small molecules", i.e. oligomers such as sexithiophene or pentacene, which are vapor-deposited by a vacuum technique, are also suitable as organic semiconductor layer. These organic layers are preferably applied in a manner already structured partially or in patterned fashion by means of a printing method (intaglio printing, screen printing, pad printing). For this purpose, the organic materials provided for the layers are formed as soluble polymers, the term polymers in this case, as already described further above, also including oligomers and "small molecules".

In this case, the electrical functional layers of the respective film body are configured such that they realize the electrical circuit illustrated in the figures FIG. 1 to FIG. 5.

The electrical circuits described below with reference to the figures FIG. 1 to FIG. 5 in each case comprise two or more charging or charge-reversal capacitors and two or more organic diodes.

Organic diodes are realized in the multilayer film body by a metal-semiconductor junction or a pn junction between an n-conducting and a p-conducting semi-conductor. In this case, the sequence of the individual functional layers can be arranged both vertically and laterally. Furthermore, it is possible here, in order to improve the electrical properties—e.g. injection of nutrient carriers—to introduce additional interlayers which supplement the electrically functional layers described above. An organic diode can thus be realized for example by means of three successive layers, the first layer being an electrically conductive electrode layer that forms the cathode, the second layer being a layer composed of an organic semi-conductor material, and the third layer being an electrically conductive electrode layer that forms the anode. In this case, the organic semiconductor layer has a layer thickness of 60 to 2000 nm, for example. The conductive layer may comprise one of the materials described above, that is to say either a metal or an organically conductive material, which can be applied by a printing process.

Furthermore, it is also possible for organic diodes to be realized by means of a four-layer construction comprising two electrode layers and two intervening organic semiconductor layers, one of which has n-conducting properties and the other of which has p-conducting properties.

Reference is made hereinafter to the content of WO 02/21612 A1 with regard to the construction of organic diodes.

Furthermore, it is also possible for the organic diodes to be formed by an organic field effect transistor whose gate electrode is connected to the drain electrode.

The charging or charge-reversal capacitors realized in the multilayer film body are formed by two electrically conductive layers and an intervening insulating layer. The electrically conductive layers may comprise one of the materials described above, may thus comprise for example metallic layers or organic electrically conductive layers, which have been applied by means of a printing method. In this case, the charging or charge-reversal capacitors have a capacitance within the range of 1 pF to 2 nF.

FIG. 1 shows a rectifier 1 comprising two organic diodes OD1 and OD2 and two charging capacitors C1 and C2. The rectifier 1 has an input E1 with input terminals E11 and E12 and an output A1. The input terminal E11 is connected to the cathode of the organic diode OD1 and to the anode of the organic diode OD2. The anode of the organic diode OD1 is connected via the charging capacitor C1 and the cathode of the organic diode OD2 is connected via the charging capacitor C2 to the input terminal E12. The output voltage is tapped off between the cathode of the organic diode OD2 and the anode of the organic diode OD1.

The input AC voltage present at the input E1 is rectified by means of the organic diode OD1 in a negative voltage across the charging capacitor C1 and rectified by means of the organic diode OD2 to form a positive voltage. The output-side DC voltage present at the output A1 thus corresponds to the sum of the magnitudes of the voltages across C1 and C2.

Figure 2:
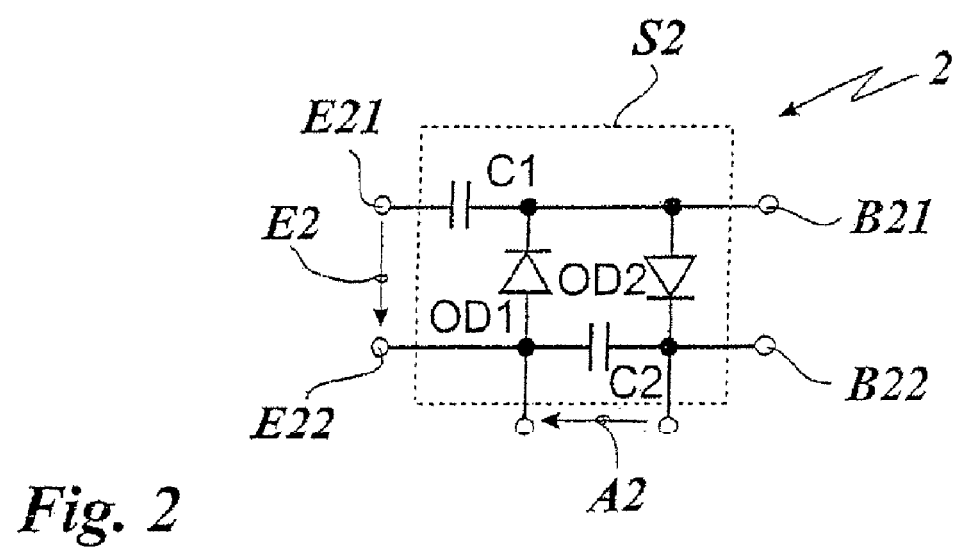
FIG. 2 shows a block diagram of an organic rectifier for a further exemplary embodiment.

FIG. 2 shows a rectifier 2 having a charge-reversal capacitor C1, a charging capacitor C2 and two organic diodes OD1 and OD2. The rectifier 2 has an input E2 with two input terminals E21 and E22, an output A2 and two coupling terminals B21 and B22. The charge-reversal capacitor C1 is connected at one end to the input terminal E21 and at the other end to the coupling terminal B21, the cathode of the organic diode OD1 and the anode of the organic diode OD2. The charging capacitor C2 is connected at one end to the anode of the organic diode OD1 and the input terminal E22 and at the other end to the cathode of the organic diode OD2 and the coupling terminal B22. The output voltage is tapped off via the charging capacitor C2. The input AC voltage applied to the input E2 is rectified by means of the organic diode OD1 to form a voltage across the charge-reversal capacitor C1. During the positive half-cycle of the input AC voltage, the positive charges situated on the charge-reversal capacitor C1 can be transported via the organic diode OD2 to the charging capacitor C2. An increased positive voltage thus builds up across the charging capacitor C2, and can be tapped off via the output A2.

Figure 3:
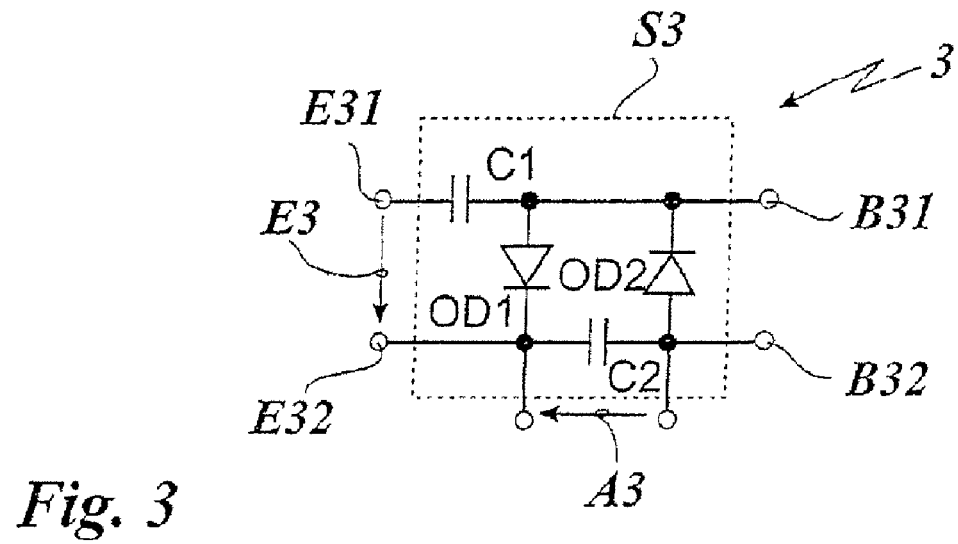
FIG. 3 shows a block diagram of an organic rectifier for a further exemplary embodiment.

FIG. 3 shows a rectifier 3 having a charge-reversal capacitor C1, two organic diodes OD1 and OD2 and a charging capacitor C2. The rectifier 3 has an input E3 with two input terminals E31 and E32, an output A3 and two coupling terminals B31 and B32. The charge-reversal capacitor C1 is connected at one end to the input terminal E31 and at the other end to the anode of the organic diode OD1, the cathode or organic diode OD2 and the coupling terminal B31. The charging capacitor C2 is connected at one end to the cathode of the organic diode OD1 and to the input terminal E32 and is connected at the other end to the anode of the organic diode OD2 and the coupling terminal B32. The output voltage is tapped off via the charging capacitor C2. In contrast to the rectifier 2, in the case of the rectifier 3, during the negative half-cycle of the input AC voltage, the negative charge situated on the charge-reversal capacitor C1 is transported via the organic diode OD2 to the charging capacitor C2. An increased negative voltage thus builds up across the charging capacitor C2, and is tapped off via the output A3.

The rectifiers illustrated in FIG. 2 and FIG. 3 can be cascaded in a cascaded arrangement in each case to form a multistage organic or printable rectifier.

Figure 4:
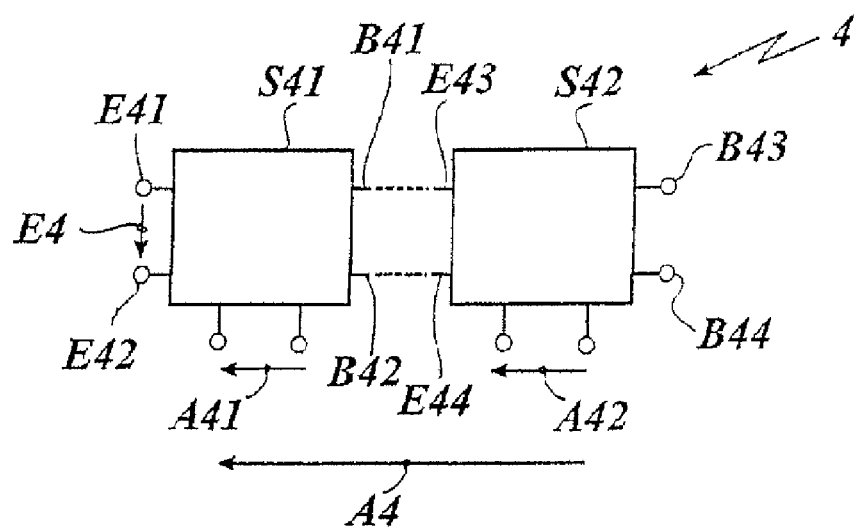
FIG. 4 shows a block diagram of a cascaded organic rectifier for a further exemplary embodiment.

FIG. 4 shows an example of such a rectifier. FIG. 4 shows a rectifier 4 constructed from two or more stages, of which two stages S41 and S42 are shown in FIG. 4. The stages S41 and S42 are in each case constructed like the rectifier 2 according to FIG. 2. The stage S41 thus has an input with two input terminals in E41 and E42, an output A41 and two coupling terminals B41 and B42. The stage S42 has two input terminals E43 and E44, an output A42 and two coupling terminals B43 and B44. The input terminals and coupling terminals of the stages S41 and S42 are connected up to a charge-reversal capacitor, a charging capacitor and two organic diodes as shown in FIG. 2.

The input terminals E41 and E42 of the first stage of the rectifier 4 form an input of the rectifier 4, which is designated by E4 in FIG. 4. The input terminals of the downstream stage are respectively connected to the coupling terminals of one stage of the rectifier 4. The output-side DC voltage thus results from the sum of the output voltages at the outputs of the individual stages, such that the voltage present at the output A4 of the rectifier 4 is increased further.

It is also possible to construct the rectifier 4 by means of a cascaded arrangement of individual stages which are each constructed like the rectifier 3 according to FIG. 3.

Figure 5:
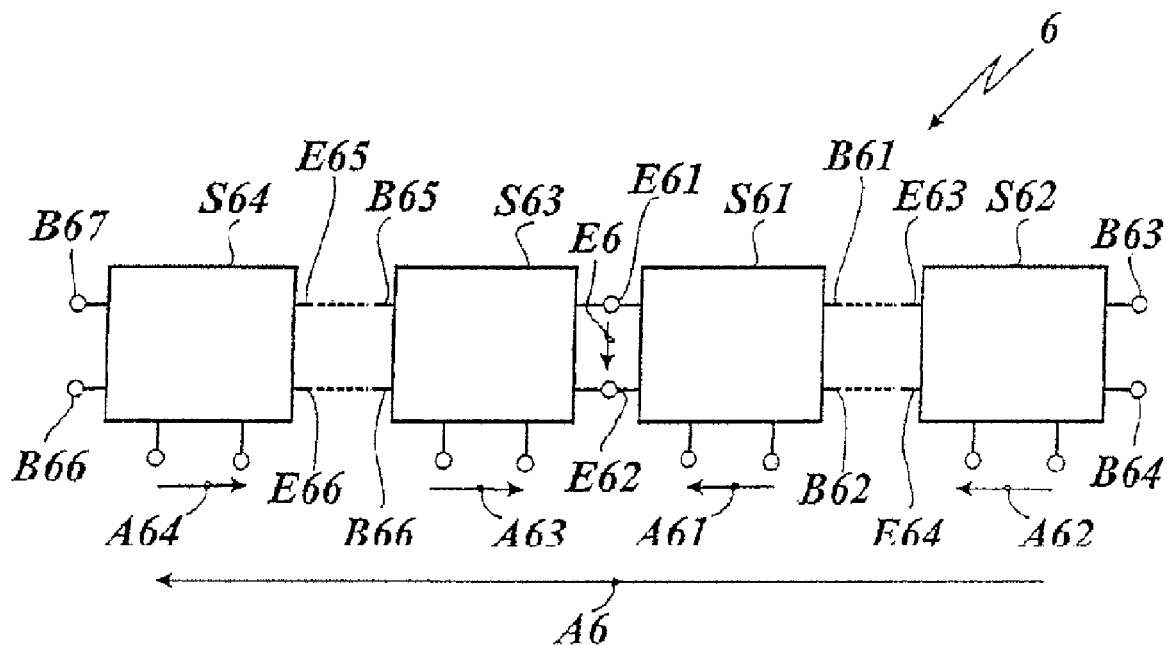
FIG. 5 shows a block diagram of a cascaded organic rectifier for a further exemplary embodiment.

FIG. 5 shows a rectifier 6 composed of differently constructed individual stages. The rectifier 6 has, on the one hand, two or more stages which are each constructed like the rectifier 2 according to FIG. 2. Of said stages, FIG. 5 shows two stages S61 and S62 having input terminals E61 and E62 and respectively E63 and E64, coupling terminals B61 and B62 and respectively B63 and B64 and outputs A61 and respectively A62. These stages, as already explained with reference to FIG. 4, are connected up to one another in a cascaded arrangement in such a way that the input terminals of the downstream stage are connected up to the coupling terminals of the preceding stage.

The rectifier 6 furthermore has two or more stages is configured like the rectifier 3 according to FIG. 3. Of said stages, FIG. 5 shows two stages S63 and S64 having input terminals E61 and E62 and respectively E65 and E66, coupling terminals B65 and B66 and respectively B67 and B68 and outputs A63 and respectively A64. Said stages are likewise connected up to one another in cascading fashion, as explained in FIG. 4, in such a way that the input terminals of the downstream stage are connected to the coupling terminals of the preceding stage. The input terminals of the stages S61 and S63 are in each case connected to the input E6 of the rectifier 6, such that the positive output voltages present at the outputs of the stages S61 and S62 are added to the negative voltages present at the outputs of the stages S63 and S64 and an increased output voltage is thus present at the output A6 of the rectifier 6.

Figure 6:
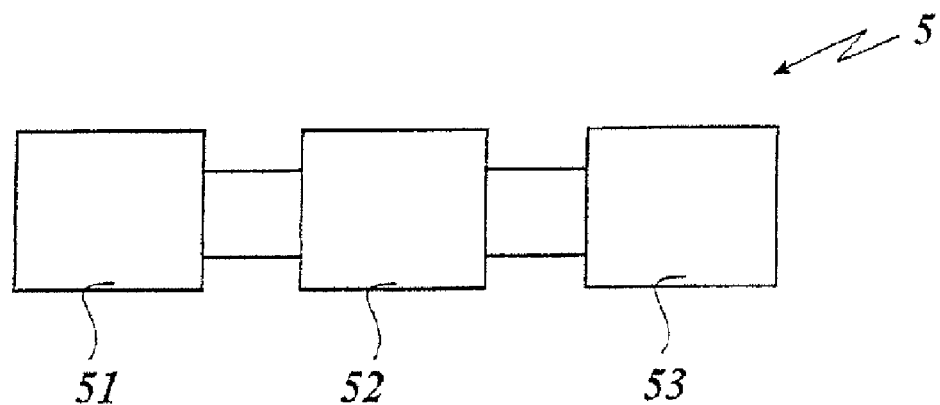
FIG. 6 shows a block diagram of an electronic device with a rectifier.

FIG. 6 shows an electronic device 5 having a power source 51, a rectifier 52 and an electronic circuit 53 fed by the rectifier 52. The electronic device 5 is an RFID transponder. The electronic device 5, as already explained with reference to the figures FIG. 1 to FIG. 5, is constructed from a multilayer flexible film body having two or more electrical functional layers.

In this case, the power source 51 is formed by an antenna resonant circuit comprising an antenna and a tuning capacitor. The rectifier 52 is formed by a rectifier constructed like one of the rectifiers 1, 2, 3, 4 or 6 according to FIG. 1 to FIG. 5.

The electronic circuit 53 is an ID code generator constructed from one or a plurality of active or passive organic components, preferably organic field effect transistors.

However, it is also possible for the electronic circuit 53 to provide a different function or to be replaced by an output unit, for example to be formed by an organic light emitting diode or a liquid crystal display.

Figure 7:
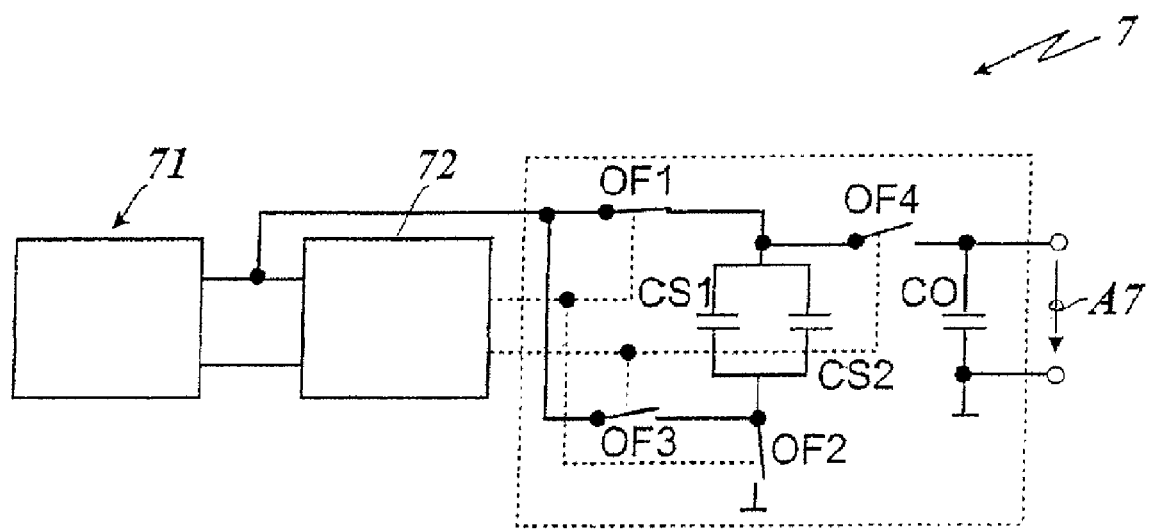
FIG. 7 shows a block diagram of an electronic device for a further exemplary embodiment.

FIG. 7 shows an electronic device 7 serving for supplying an organic or printable logic circuit. The electronic device 7 has a voltage source 71, a logic circuit 72, a plurality of organic field effect transistors OF1, OF2, OF3, OF4, two charge-reversal capacitors CS1 and CS2 and a charging capacitor CO. The two charge-reversal capacitors CS1 and CS2 in each case have the capacitance of the charging capacitor CO and can also be replaced by a capacitor having twice the capacitance or a greater capacitance. In this case, the logic circuit is fed by the output voltage present at an output A7 of the electronic device.

The voltage source 71 supplies an arbitrary AC voltage with or without a DC voltage component. The voltage source 71 can thus be formed for example by an antenna resonant circuit according to FIG. 6 and/or by a battery, for example a printed battery or storage battery. The logic circuit 72 comprises one or a plurality of organic field effect transistors connected up to one another. It controls a switching matrix comprising the organic field effect transistors OF1 to OF4. Through suitable construction and driving of the switching matrix, a DC voltage arises as a result of the charging and charge-reversal processes at the output of the switching matrix. The logic circuit 72 thus drives the organic field effect transistors OF1 to OF4 for example in such a way that during the positive half-cycle, the field effect transistors OF1 and OF2 are turned on and the field effect transistors OF3 and OF4 are turned off. During a further positive half-cycle, the organic field effect transistors OF3 and OF4 are then turned on and the organic field effect transistors OF1 and OF2 are turned off.

Furthermore, it is also possible to provide even further organic field effect transistors in the switching matrix in order thus for example to utilize the negative half-cycle of the voltage source 71. Furthermore, it is also possible in this way to increase a DC voltage present on the input side at the switching matrix.

Figure 8:
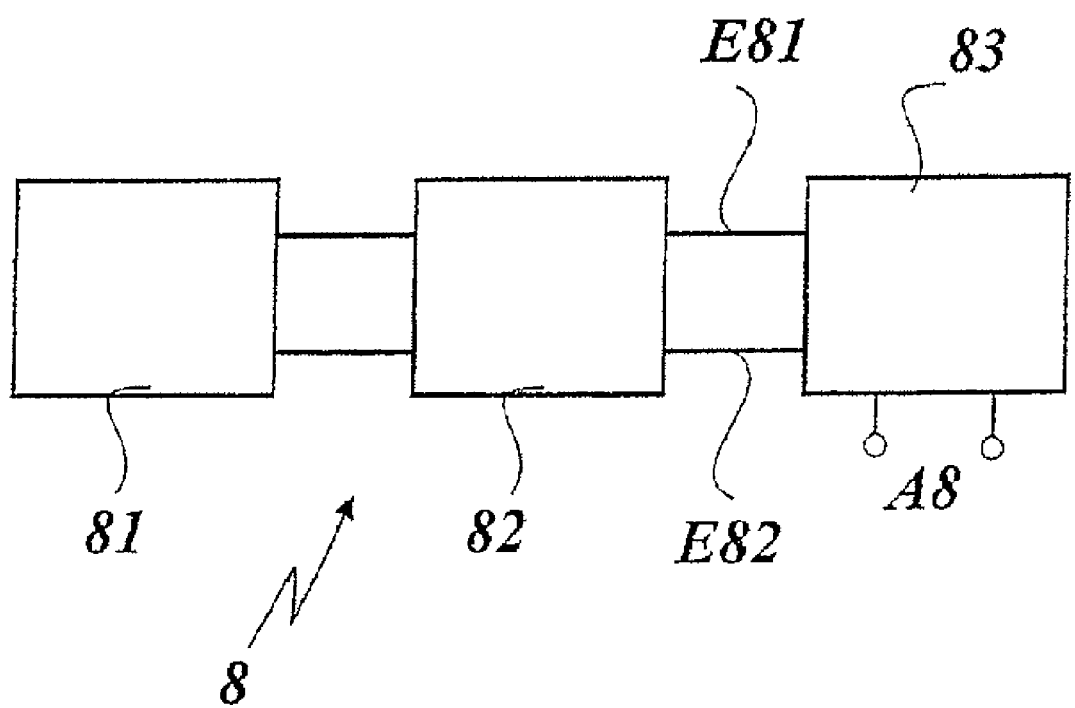
FIG. 8 shows a block diagram of an electronic device for a further exemplary embodiment.

FIG. 8 shows an electronic device having a voltage source 81, an oscillator 82 and a rectifier 83. The rectifier 83 has an input with two input terminals A81 and A82 and an output 8. The rectifier 83 is constructed like one of the rectifiers 1, 2, 3, 4 and 6 according to FIG. 1 to FIG. 5.

The voltage source 81 is a DC voltage source, for example a battery. Furthermore, it is also possible for the voltage source 81 to be a rectifier which is constructed according to the figures FIG. 1 to FIG. 5 and which is fed by an AC voltage source, for example an antenna resonant circuit.

The oscillator 82 is a printable ring oscillator which converts the input voltage into an AC voltage, preferably having a frequency of less than 1 MHz. The rectifier 83 is a rectifier which is constructed like one of the rectifiers according to the figures FIG. 1 to FIG. 5. By means of this construction, the voltage is effectively rectified into a DC voltage present at the output 8.

It is also possible for a rectifier according to the figures FIG. 1 to FIG. 5 also to be combined with a rectifier according to FIG. 7 in this way, that is to say for a rectifier according to the figures FIG. 1 to FIG. 5 together with an AC voltage source to form the voltage source 71 according to FIG. 7. An arrangement of this type makes it possible to obtain for example an impedance matching to the electronic circuit supplied by the rectifier.

The invention claimed is:

1. A rectifier for an electronic device for converting an AC voltage present between two input terminals into a DC voltage, comprising:
   two input terminals;
   an antenna resonant circuit comprising an antenna and a capacitor;
   at least two organic diodes and/or organic field effect transistors, each having at least one electrical functional layer composed of a semiconducting organic material, and wherein the at least two organic diodes and/or organic field effect transistors are coupled to the antenna resonant circuit; and
   two or more charging or charge-reversal capacitors connected to the two or more organic diodes and/or organic field effect transistors for charging of or charge-reversal of the two or more capacitors via different current paths;
   the rectifier being constructed from two or more stages connected to one another, wherein in each case, two charging or charge-reversal capacitors and two organic diodes are connected such that the charging or charge-reversal capacitors are charged via different current paths, and in each case have two input terminals and two coupling terminals for coupling to the input terminals of a further stage.

2. The rectifier as claimed in claim 1, wherein a first charging capacitor and a first organic diode are arranged in a first conducting line branch, in that a second charging capacitor and a second organic diode are arranged in a second conducting line branch, in that the first and the second conducting line branch are coupled in a parallel arrangement to the input terminals of the rectifier, and in that the first and the second organic diode are connected in a back-to-back arrangement of the respective anode and cathode in the first and the second conducting line branch.

3. The rectifier as claimed in claim 1, wherein a first organic diode and a second organic diode are connected in a back-to-back arrangement of the respective anode and cathode via a charge-reversal capacitor to the first input terminal of the rectifier, in that the first organic diode is connected to the second input terminal of the rectifier and the second organic diode is connected via a charging capacitor to the second input terminal of the rectifier.

4. The rectifier as claimed in claim 3, wherein the cathode of the first organic diode and the anode of the second organic diode are connected via the charge-reversal capacitor to the first input terminal, in that the anode of the first organic diode and the cathode of the second organic diode are connected to one another via the charging capacitor, and in that the anode of the first organic diode is connected to the second input terminal.

5. The rectifier as claimed in claim 3, wherein the anode of the first organic diode and the cathode of the second organic diode are connected via the charge-reversal capacitor to the first input terminal, in that the cathode of the first organic diode and the anode of the second organic diode are connected to one another via the charging capacitor, and in that the cathode of the first organic diode is connected to the second input terminal.

6. The rectifier as claimed in claim 1, wherein, in a first stage, the cathode of the first organic diode and the anode of the second organic diode are connected to the first coupling terminal of the first stage and via the charge-reversal capacitor to the first input terminal of the first stage, in that the anode of the first organic diode and the cathode of the second organic diode are connected to one another via the charging capacitor, and in that the anode of the first organic diode is connected to the second input terminal of the first stage and the cathode of the second organic diode is connected to the second coupling terminal of the first stage.

7. The rectifier as claimed in claim 6, wherein the rectifier has two or more first stages, the first and the second input terminal of the foremost first stage forming the first and respectively the second input terminal of the rectifier (4), the first and the second coupling terminal of the respective first stage being connected to the first and respectively second input terminal of the downstream first stage, provided that the respective first stage does not form the last stage of the rectifier, and the output of the rectifier being formed by the second input terminal of the foremost first stage and by the second coupling terminal of the last first stage.

8. The rectifier as claimed in claim 1, wherein, in a second stage, the anode of the first organic diode and the cathode of the second organic diode are connected to the first coupling terminal of the second stage and via the charge-reversal capacitor to the first input terminal of the second stage, in that the cathode of the first organic diode and the anode of the second organic diode are connected to one another via the charging capacitor, and in that the cathode of the first organic diode is connected to the second input terminal of the second stage and the anode of the second organic diode is connected to the second coupling terminal of the second stage.

9. The rectifier as claimed in claim 8, wherein the rectifier has two or more second stages, the first and the second input terminal of the foremost second stage forming the first and respectively the second input terminal of the rectifier, the first and the second coupling terminal of the respective second stage being connected to the first and respectively second input terminal of the downstream second stage, provided that the respective second stage does not form the last stage of the rectifier, and the output of the rectifier being formed by the second input terminal of the foremost second stage and by the second coupling terminal of the last second stage.

10. The rectifier as claimed in claim 6 wherein the rectifier has one or a plurality of first stages and one or a plurality of second stages, in that the first and the second input terminals of a first stage are connected to the first and respectively second input terminal of a second stage and form the first and respectively the second input terminal of the rectifier, and in that the output of the rectifier is formed by the second coupling terminal of the last first stage and by the second coupling terminal of the last second stage.

11. The rectifier as claimed in claim 1 wherein one or a plurality of the organic diodes are formed by organic field effect transistors whose gate electrode is connected to the source or drain electrode.

12. The rectifier as claimed in claim 1, wherein one or a plurality of the organic diodes has an interlayer for lowering the parasitic capacitance of the organic diode.

13. The rectifier as claimed in claim 1, wherein the first and/or the second input terminal of the rectifier is connected via one or a plurality of first organic field effect transistors to the charge-reversal capacitor, in that the charge-reversal capacitor is connected via one or a plurality of second field effect transistors to the charging capacitor, and in that the one or the plurality of first field effect transistors are driven by a logic circuit.

14. An electronic device in the form of a flexible, multi-layer film body of an RFID transponder, wherein the electronic device has a voltage source and a rectifier as claimed in one of the preceding claims, said rectifier being fed by the voltage source, the voltage source having the antenna resonant circuit, for coupling in an electromagnetic radiation radiated onto the electronic device.

15. The electronic device as claimed in claim 14, wherein the electronic device comprises an electronic circuit based on one or a plurality of active or passive organic components fed by the rectifier.

16. A rectifier for an RFID transponder for converting an applied AC voltage present between two input terminals of the rectifier into a DC voltage, comprising:
at least two organic diodes and/or organic field effect transistors coupled to the input terminals, each of the at least two organic diodes and/or organic field effect transistors each having at least one electrical functional layer composed of a semiconducting organic material; and
two or more charging or charge-reversal capacitors connected to the at least two or more organic diodes and/or organic field effect transistors for charging of or charge-reversal of the two or more charging or charge-reversal capacitors via different current paths;
the rectifier being constructed of two or more stages connected to one another and which have in each case two charging or charge-reversal capacitors and the two organic diodes are connected such that the charging or charge-reversal capacitors are charged via different current paths, and which have in each case two input terminals and two coupling terminals for coupling to the input terminals of a further stage.

17. The rectifier of claim 16 further including a voltage source coupled to the input terminals comprising an antenna resonant circuit including an antenna and a further capacitor, for converting an AC voltage present between the two input terminals into the applied voltage.

* * * * *